March 17, 1953    J. H. TANSEY    2,631,488
GRIP BOLT
Filed Jan. 10, 1950
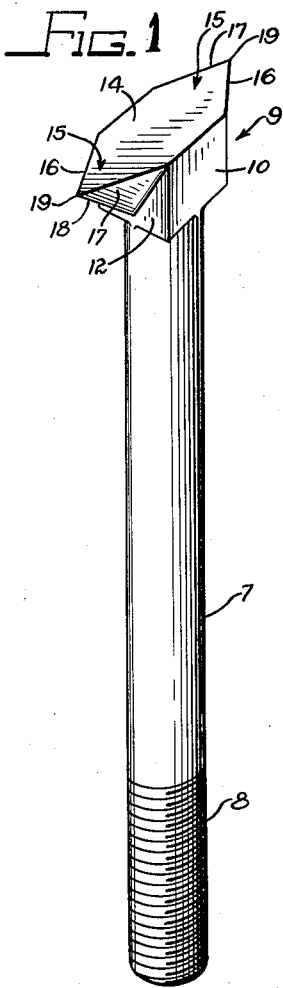
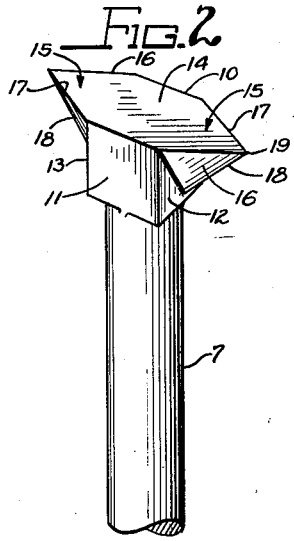
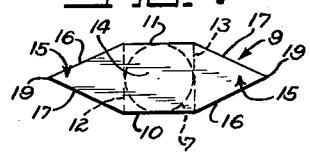
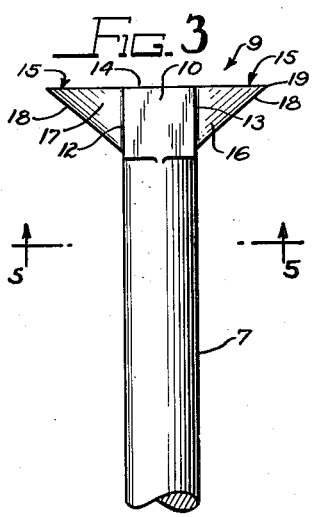
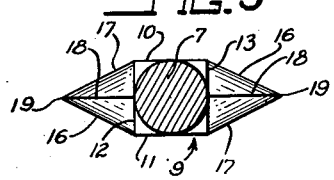
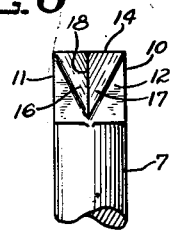
Inventor
John H. Tansey
by: Carlson, Pitzner, Hubbard & Wolf
attys.

Patented Mar. 17, 1953

2,631,488

UNITED STATES PATENT OFFICE 2,631,488

GRIP BOLT

John H. Tansey, Peoria, Ill., assignor of one-third to Alwin F. Pitzner, Winnetka, Ill.

Application January 10, 1950, Serial No. 137,777

2 Claims. (Cl. 85—9)

The present invention relates to improvements in grip-bolts.

One of the objects of the present invention is to provide a new and improved grip-bolt having a special head construction which can be readily forced into wood or other like materials as a wedge, as in carpentry work, or anchored in position, as between the ends or courses of brick, in masonry work, and which serves effectively to prevent rotation of the bolt when threading and tightening a nut thereon even though the nut should encounter a difficult thread obstruction.

Another object is to provide a grip-bolt of the foregoing character in which the head construction has a defined central head portion substantially of no greater lateral dimension than the diameter of the bolt shank and wedge-shaped wings projecting radially outwardly from and beyond opposite sides of the central head portion, whereby to provide such construction that is elongated transversely of the bolt axis and at least as narrow as the bolt shank.

A further object is to provide a grip-bolt of the foregoing character which is simple and inexpensive in construction and which is efficient and reliable in use.

Other objects and advantages will become apparent as the description proceeds.

In the accompanying drawings,

Fig. 1 is a perspective view from one direction of a grip-bolt embodying the features of the present invention.

Fig. 2 is a fragmentary view similar to Fig. 1 but taken in another direction.

Fig. 3 is a fragmentary side elevational view of the bolt.

Fig. 4 is a plan view of the head end of the bolt.

Fig. 5 is a transverse sectional view taken in the plane of line 5—5 of Fig. 3, and illustrating the underside of the bolt head.

Fig. 6 is a fragmentary side elevational view of the bolt taken at right angles to the view in Fig. 3.

Referring more particularly to the drawings, the grip-bolt constituting the exemplary embodiment of the present invention comprises generally a bolt shank 7 which preferably and usually is straight cylindrical in shape and formed with threads 8 at the free end, and a head 9 integral with the other end of the shank. The present invention relates primarily to the construction of the head 9.

In the preferred form of the invention, the bolt head 9 is basically cubical in shape, having square sides 10, 11, 12 and 13 and a top surface 14. Preferably, although not essentially, the transverse dimensions of the head 9 are substantially equal to the diameter of the shank 7. For purposes of illustration, assuming a shank 7 having a diameter of three-eighths (⅜) of an inch, the basic or cubical portion of the head would be three-eighths (⅜) of an inch square in cross-section, and preferably also, but not essentially, the same dimension in depth in the direction of the shank axis, so as to be cubical in shape.

Particularly characterizing the invention are a plurality of wing elements 15 projecting laterally outwardly from and beyond the confines of the central cubical portion of the head 9. Although any suitable number of these wing elements 15 may be provided within the broad concept of the invention, certain important advantages reside in providing two such elements in diametrically opposed relation with respect to the axis of the shank 7. In the form shown, the two wing elements 15 are substantially alike, thus imparting a laterally symmetrical shape to the head 9, and are wedge-shaped on the underside. More particularly, each wing element 15 has a flat top surface flush with the surface 14 and in effect constituting an extension thereof, and two opposite side surfaces 16 and 17 inclined downwardly to merge along a medial edge 18 in a radial plane through the axis of the shank 7. Each wing element 15 also is tapered radially so that the medial edge 18 is inclined radially and upwardly from the contiguous side of the central cubical portion to the top surface 14. As a result, each wing element 15 has three component triangular surfaces, namely, the top surface and the two side surfaces 16 and 17, all converging outwardly to a sharp point 19 in the plane of the surface 14. The element may therefore be characterized as tapered or wedge-shaped in three directions, i. e., radially, laterally and longitudinally of the axis of the shank 7.

The wing elements 15 may be provided in any suitable size in relation to the dimensions of the central cubical portion of the head 9. In the preferred form, the top surface of each has the shape of an isosceles triangle, the base edge of which is coextensive with the width of the central cubical head portion, and the side edges of which are longer than the base edge. The maximum depth along the shank axis is substantially equal to but somewhat less than the depth of the central cubical portion so that the medial wedge edge 18 merges with the contiguous side surface of the latter.

The grip-bolt of the present invention is highly useful for many purposes, and is especially advantageous in carpentry and masonry work. It effectively avoids the objections often encountered in the use of round-headed bolts, such as carriage bolts. The latter, even though provided with non-circular protuberances on the shank below the head, will frequently turn when the nut, upon being applied, encounters a thread obstruction or heavy turning resistance. Such turning, when it occurs, is annoying and a nuisance, and may result in serious loss in production.

The grip-bolt is especially advantageous because of the narrow form of the head with the wedge-shaped wing elements 15 projecting laterally from opposite sides thereof. Since the width of the head and wings is no greater than the diameter of the bolt shank, it can be located in narrow spaces just large enough to receive the shank. For example, the head may be quickly and conveniently placed for anchorage purposes between the ends or flights of bricks in masonry work, and when so placed will be held effectively by the projecting wing elements against any possibility of rotation. Since the head may be no larger or in any event very little larger than the diameter of the shank, the bricks need be spaced no farther apart than customary in brick work and special space to receive the head need not be chipped out.

The wedge wings also adapt the bolt for advantageous use in any material such as wood or the like commonly used in carpentry. The triangular wedges can be forced readily into the material, and occupy little space. Yet, they serve effectively to prevent rotation of the bolt. This is especially important where as building proceeds, the head becomes inaccessible or not readily accessible since by insuring that the bolt will not turn, annoyance and inconvenience and loss of production are avoided.

I claim as my invention:

1. A grip bolt comprising, in combination, a cylindrical shank with threads on one end, a cubical head on the other end of said shank and being substantially the same in dimensions as the diameter of said shank, and two wing elements being integral with and projecting radially from opposite sides of said head and being flush with the top surface thereof, each wing element being tapered radially outwardly and being wedge-shaped on the underside to define an inclined medial wedge edge extending from the contiguous side of said cubical head to an apex point at the outer end of said element in the top surface thereof, each element being coincident in width at the base of the top surface thereof with the width of said cubical head and having a maximum depth at the base slightly less than the depth of said head, each wing element in effect being tapered radially, transversely and axially of the axis of said shank, thus comprising three component triangular sides, the top side being in the shape of an isosceles triangle of which the base is shorter than the side edges.

2. A grip member comprising, in combination, a cylindrical shank having a square head on one end thereof, said head having a top surface defining the outer extremity of said end, the transverse dimensions of said head being limited by the transverse dimensions of said shank, and two wing elements integral with and projecting radially from opposite sides of said head and being flush with said top surface thereof, each of said wing elements being tapered radially outwardly and being wedge shaped on the under side to define an inclined medial wedge edge extending from the contiguous side of said head to an apex point on the outer end of said element in the top surface thereof, the width of said top surface of each element being limited by the transverse dimension of said head, each element having a maximum depth at the base limited by the axial length of said head, each wing element in effect being tapered radially and axially of the axis of said shank, thus comprising three component triangular sides, the top one of said sides being in the shape of an isosceles triangle.

JOHN H. TANSEY.

REFERENCES CITED

The following references are of record in the file of this patent:

UNITED STATES PATENTS

| Number | Name | Date |
|---|---|---|
| 337,765 | Guss | Mar. 9, 1886 |
| 547,812 | Shedlock | Oct. 15, 1895 |
| 1,414,979 | Carter | May 2, 1922 |
| 2,163,446 | Heckman | June 20, 1939 |